(12) United States Patent
Hirano

(10) Patent No.: US 12,181,765 B2
(45) Date of Patent: Dec. 31, 2024

(54) ELECTROCHEMICAL DEVICE HAVING ELECTRODES SELECTIVELY COUPLED BY A CONDUCTIVE MEMBER

(71) Applicant: STANLEY ELECTRIC CO., LTD., Tokyo (JP)

(72) Inventor: Tomoya Hirano, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 567 days.

(21) Appl. No.: 17/441,275

(22) PCT Filed: Mar. 16, 2020

(86) PCT No.: PCT/JP2020/011538
§ 371 (c)(1),
(2) Date: Sep. 20, 2021

(87) PCT Pub. No.: WO2020/196054
PCT Pub. Date: Oct. 1, 2020

(65) Prior Publication Data
US 2022/0146899 A1 May 12, 2022

(30) Foreign Application Priority Data
Mar. 22, 2019 (JP) .................................. 2019-055271

(51) Int. Cl.
*G02F 1/155* (2006.01)
*G02F 1/153* (2006.01)
(Continued)

(52) U.S. Cl.
CPC ............ *G02F 1/155* (2013.01); *G02F 1/1503* (2019.01); *G02F 1/1506* (2013.01); *G02F 1/1533* (2013.01)

(58) Field of Classification Search
CPC ...... G02F 1/155; G02F 1/1503; G02F 1/1506; G02F 1/1533
(Continued)

(56) References Cited

U.S. PATENT DOCUMENTS 10,831,078 B2 11/2020 Hirano
2003/0179432 A1 9/2003 Vincent et al.
(Continued)

FOREIGN PATENT DOCUMENTS

| CN | 107991824 A | 5/2018 |
|---|---|---|
| JP | 2004170613 A | 6/2004 |

(Continued)

OTHER PUBLICATIONS

Stack Exchange webpage https://electronics.stackexchange.com/questions/9147/tips-for-wire-to-pad-and-wire-to-wire-soldering (Year: 2011).*

(Continued)

*Primary Examiner* — George G. King
(74) *Attorney, Agent, or Firm* — Holtz, Holtz & Volek PC

(57) ABSTRACT

An optical element according to some embodiments includes: a plurality of lower electrodes spread on a surface of a lower substrate and including first and second lower electrodes arranged adjacent in a first direction in the lower substrate plane; a plurality of upper electrodes spread on a surface of an upper substrate and including a first upper electrode that faces the first lower electrode and a second upper electrode that faces a portion of the first lower electrode and the second lower electrode; and a conductive member that is sandwiched between and electrically connects the first lower electrode and the second upper electrode, the conductive member being selectively disposed in an overlap region in which the first lower electrode and the second upper electrode overlap when the first lower elec- (Continued)

trode and the second upper electrode are projected on a virtual plane parallel to the lower substrate or the upper substrate.

3 Claims, 17 Drawing Sheets

(51) Int. Cl.
*G02F 1/1503* (2019.01)
*G02F 1/1506* (2019.01)

(58) Field of Classification Search
USPC .......................................................... 359/266
See application file for complete search history.

(56) References Cited

U.S. PATENT DOCUMENTS

| | | |
|---|---|---|
| 2009/0243502 A1 | 10/2009 | Kizaki et al. |
| 2009/0303565 A1* | 12/2009 | Karmhag ............. G02F 1/1533 359/265 |
| 2011/0260961 A1* | 10/2011 | Burdis ................... G02F 1/153 216/13 |
| 2012/0062976 A1 | 3/2012 | Burdis |
| 2013/0057939 A1 | 3/2013 | Yeh et al. |
| 2018/0275476 A1 | 9/2018 | Hirano |
| 2019/0004386 A1 | 1/2019 | Bergh et al. |
| 2019/0101805 A1* | 4/2019 | Hirano ................. G02F 1/1506 |

FOREIGN PATENT DOCUMENTS

| | | |
|---|---|---|
| JP | 2005521103 A | 7/2005 |
| JP | 2007134143 A | 5/2007 |
| JP | 2009230073 A | 10/2009 |
| JP | 2012181389 A | 9/2012 |
| JP | 2013519925 A | 5/2013 |
| JP | 2019066619 A | 4/2019 |
| WO | 03081330 A1 | 10/2003 |

OTHER PUBLICATIONS

Chen et al. "Fabrication of Highly Transparent and Conductive Indium-Tin Oxide Thin Films with a High Figure of Merit via Solution Processing" Langmuir, vol. 29, Iss. 45, pp. 13655-13990 (Year: 2013).*
Raj et al. "Development and characterization of eutectic Sn—Zn, Sn—Ag, Sn—Bi and Sn—Cu solder alloys" International Journal of Materials Research, vol. 110, Iss. 12 pp. 1150-1159 (Year: 2019).*
Japanese Office Action dated Jun. 29, 2021 (and English translation thereof) issued in Japanese Application No. 2017-190605.
International Search Report (ISR) (and English translation thereof) dated Apr. 14, 2020 issued in International Application No. PCT/JP2020/011538.
Written Opinion dated Apr. 14, 2020 issued in International Application No. PCT/JP2020/011538.
Extended European Search Report (EESR) dated Nov. 18, 2022, issued in counterpart European Application No. 20777011.6.

* cited by examiner

PRIOR ART

PRIOR ART

PRIOR ART

ELECTROCHEMICAL DEVICE HAVING ELECTRODES SELECTIVELY COUPLED BY A CONDUCTIVE MEMBER

TECHNICAL FIELD

The present disclosure relates to an optical element that can switch between at least two types of optical states.

BACKGROUND ART

Optical elements that can switch between optical states have been proposed.

Unexamined Japanese Patent Application Publication No. 2012-181389 discloses a so-called electrodeposition element. Electrodeposition elements mainly include a pair of transparent electrodes disposed facing each other, and an electrolyte layer that is sandwiched by that pair of transparent electrodes and that contains an electrodeposition material that includes silver.

The electrolyte layer is substantially transparent and, at normal times (when voltage is not applied), the electrodeposition element is in a transparent state. When voltage is applied between the pair of transparent electrodes, the electrodeposition material (silver) of the electrolyte layer precipitates/deposits on the electrodes due to an electrochemical reaction (oxidation/reduction reaction). The electrodeposition material that precipitates/deposits on the surfaces of the flat electrodes forms a mirror face, and the electrodeposition element assumes a mirror surface (light reflecting) state.

Unexamined Japanese Patent Application Publication No. 2007-134143 discloses a so-called electrochemical luminescence element. A pair of substrates, and a layer including an electrochemical luminescence material sandwiched between transparent electrodes are provided. Luminescence is generated by the excitation and deactivation of cation radicals and anion radicals due to the application of voltage.

Unexamined Japanese Patent Application Publication No. 2004-170613 and Japanese Unexamined Patent Application Publication (Translation of PCT Application) No. 2005-521103 disclose a so-called electrochromic element. A pair of substrates, and a layer including an electrochromic material sandwiched between transparent electrodes are provided. When voltage is applied, the molecular structure of the electrochromic material changes due to an electrochemical reaction, and discoloration occurs.

SUMMARY OF INVENTION

In optical elements that use electrochemical reactions, typically, when the element size is large, optical characteristics vary depending on position.

An objective of the present disclosure is to provide an optical element that has uniform optical characteristics in the element plane.

According to a main aspect of the present disclosure, an optical element is provided that includes: a lower substrate and an upper substrate disposed facing each other; a plurality of lower electrodes provided so as to be spread on a surface of the lower substrate that faces the upper substrate, and including at least first and second lower electrodes arranged adjacent in a first direction in the lower substrate plane; a plurality of upper electrodes provided so as to be spread on a surface of the upper substrate that faces the lower substrate, and including at least a first upper electrode that faces the first lower electrode and a second upper electrode that faces a portion of the first lower electrode and the second lower electrode; a conductive member that is sandwiched between the first lower electrode and the second upper electrode and that electrically connects the first lower electrode to the second upper electrode, the conductive member being selectively disposed in an overlap region in which the first lower electrode and the second upper electrode overlap when the first lower electrode and the second upper electrode are projected on a virtual plane parallel to the lower substrate or the upper substrate; and an electrolyte layer with which space between the lower substrate and the upper substrate is filled.

According to the present disclosure, an optical element that has uniform optical characteristics in the element plane can be obtained.

DESCRIPTION OF EMBODIMENTS

Firstly, the fundamental structure and functions of an electrodeposition (ED) element are described while referencing an ED element according to a reference example.

Figure 1A:
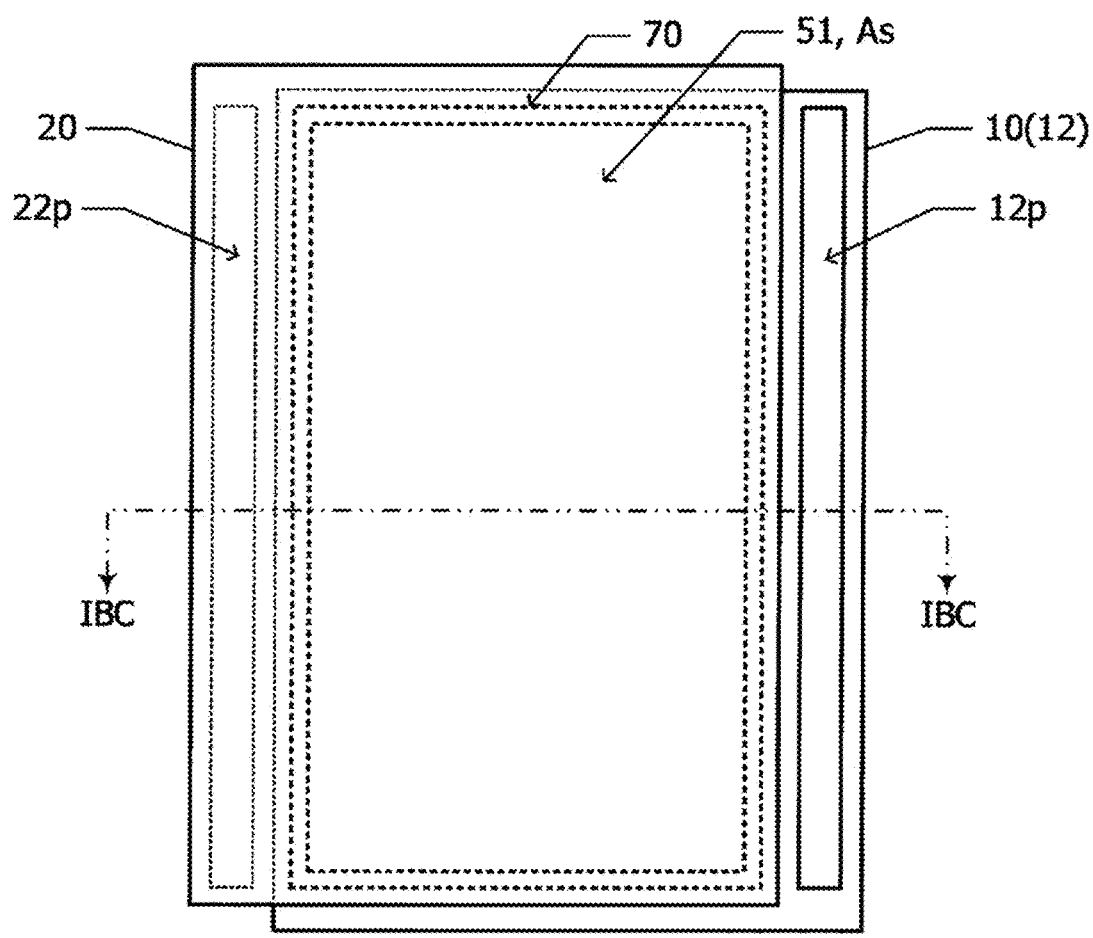
FIGS. 1A to 1C are a plan view and cross-sectional views illustrating an electrodeposition element according to a reference example.
Figure 1B:
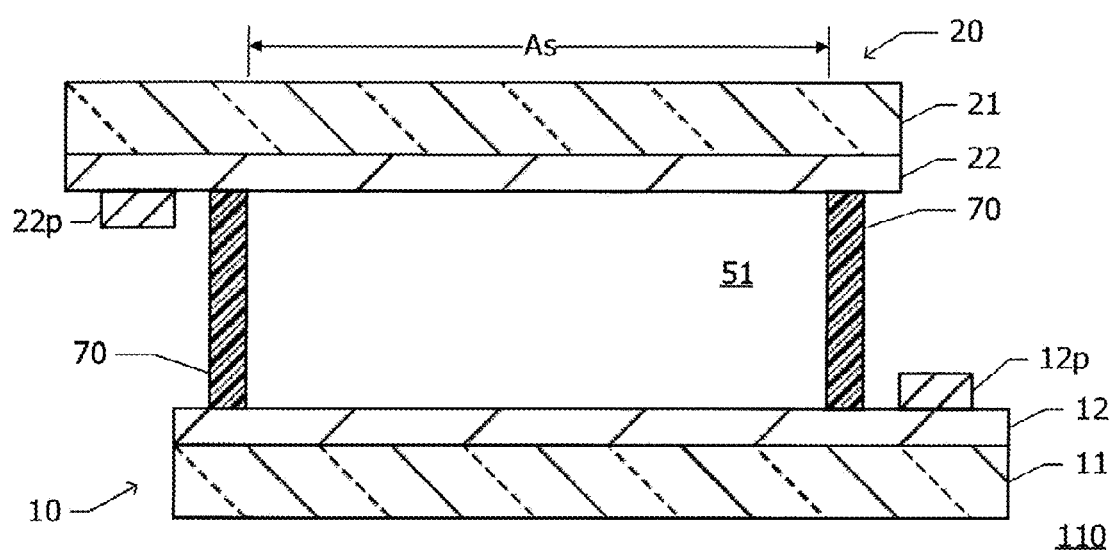
Figure 1C:
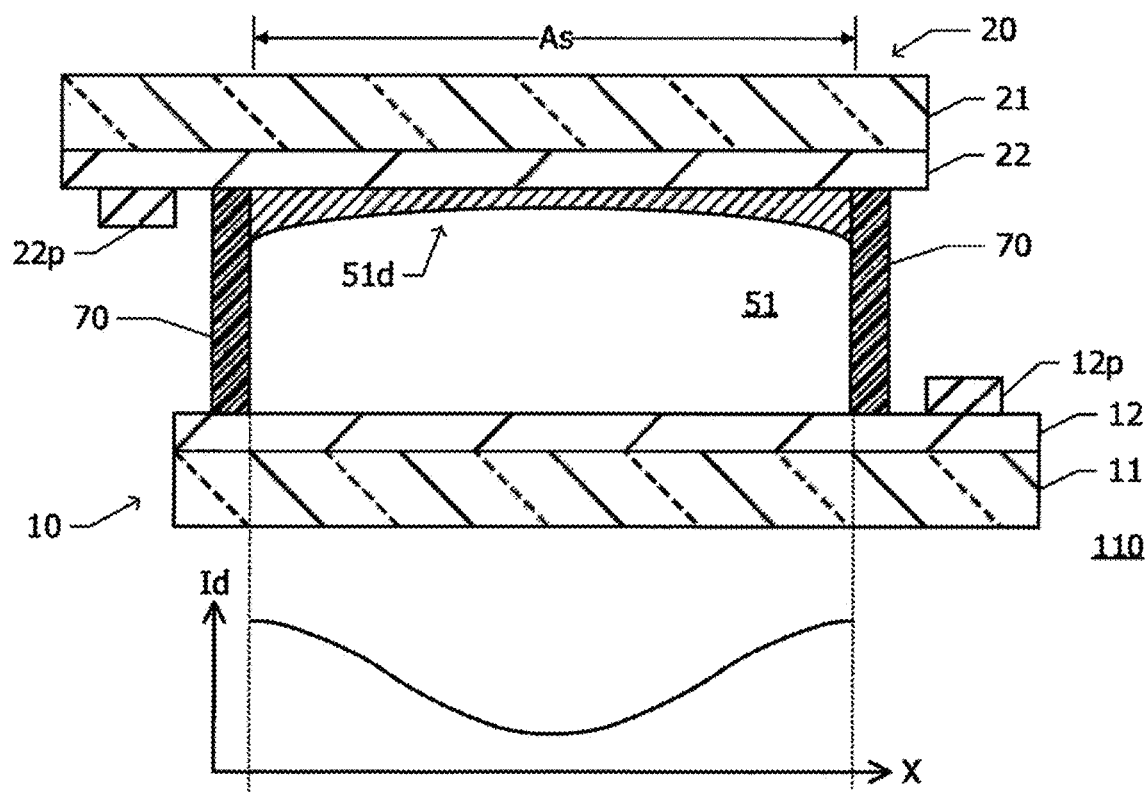

FIGS. 1A to 1C are a plan view and cross-sectional views illustrating an ED element 110 according to the reference example. The IBC-IBC cross-section in the plan view illustrated in FIG. 1A corresponds to the cross-sectional views illustrated in FIGS. 1B and 1C. Note that relative sizes and positional relationships of the various constituents illustrated in the drawings differ from reality.

As illustrated in FIG. 1A, the ED element 110 mainly includes lower and upper substrates 10 and 20 disposed facing each other, and an electrolyte layer (electrolytic solution) 51 and a seal frame member 70 sandwiched between the lower and upper substrates 10 and 20. In FIG. 1A, the portion of the lower substrate 10 hidden by the upper substrate 20, and the outline of the seal frame member 70 are illustrated by dashed lines.

Note that power supply connection electrodes 12p and 22p that connect to an external power supply are provided on the opposing surfaces of the lower and upper substrates 10 and 20. In FIG. 1A, the outline of the power supply connection electrode 22p provided on the upper substrate 20 is also illustrated by a dashed line. The power supply connection electrodes 12p and 22p are disposed so as to face, in a lateral direction (width, direction, X direction, first direction), the outside of the seal frame member 70, that is, both sides of the electrolyte layer 51. Additionally, in one example, each of the power supply connection electrodes 12p and 22p has a rectangular shape elongated in a vertical direction (length direction, Y direction, second direction).

The seal frame member 70 is provided on the periphery of a region in which the lower substrate and the upper substrate 10 and 20 overlap each other. Space defined by the lower and upper substrates 10 and 20 and the seal frame member 70 is filled with the electrolytic solution 51. The region that is surrounded by the seal frame member 70 and that is filled with the electrolytic solution 51 is a switching region As, and the optical state of the switching region As can be switched. In one example, the size of the switching region As is 250 mm vertical (length)×64 mm horizontal (width).

As illustrated in FIG. 1B, the lower substrate 10 has a structure in which a transparent electrode 12 is stacked on the surface (opposing surface) of a transparent substrate 11. Additionally, the upper substrate 20 has a structure in which a transparent electrode 22 is stacked on the surface (opposing surface) of a transparent substrate 21. The transparent electrodes 12 and 22 are disposed so as to face each other.

Glass substrates or similar light-transmitting substrates are used for the transparent substrates 11 and 21. A light-transmitting and electrically conductive member such as, for example, indium tin oxide (ITO), indium zinc oxide (IZO), or the like is used for the transparent electrodes 12 and 22.

The electrode 12p that is connected to an external power supply (for example, a positive electrode terminal or a common terminal of that external power supply) is provided on a surface of the lower electrode 12, outside the seal frame member 70. Additionally, the electrode 22p that is connected to an external power supply (for example, a negative electrode terminal of the external power supply) is provided on a surface of the upper electrode 22, outside the seal frame member 70. Conductive tape or a metal member such as silver that has lower electrical resistivity (higher electrical conductivity) than the ITO or similar transparent electrode is used for the power supply connection electrodes 12p and 22p.

The seal frame member 70 is constituted by a resin member or the like, and is provided with a closed shape along the periphery of the lower and upper substrates 10 and 20 in the plane of the lower and upper substrates 10 and 20 (see FIG. 1A). The spacing (cell gap) between the lower and upper substrates 10 and 20 is defined by the seal frame member 70 and a non-illustrated gap control agent. In one example, the spacing between the lower and upper substrates 10 and 20 is about 100 μm.

The electrolyte layer (electrolytic solution) 51 is obtained by dissolving an electrodeposition (ED) material (for example, silver) in a solvent, and space defined by the lower and upper substrates 10 and 20 and the seal frame member 70 is filled with the electrolytic solution 51. The electrolyte layer 51 is generally transparent and, at a normal time (when voltage is not applied), the entire ED element 110 (the switching region As) realizes a light transmitting state.

The ED element 110 can, for example, be fabricated as follows.

Soda lime glass substrates with 5Ω/□ITO are prepared as the upper and lower substrates 10 and 20. The ITO films serving as the electrodes 12 and 22 can be formed by sputtering, a chemical vapor deposition (CVD) method, vapor depositing, or the like. Additionally, the ITO films can be patterned into a desired flat shape by photolithography.

The gap control agent is sprayed on one of the upper and lower substrates 10 and 20, for example, on the lower substrate 10. It is possible to adjust the thickness of the electrolyte layer (electrolytic solution) 51 to a range of, for example, 1 μm to 500 μm by selecting the diameter of the gap control agent.

A main seal pattern (rectangular seal pattern with a part missing) is formed using a sealing material, on one of the upper and lower substrates 10 and 20, for example, on the lower substrate 10. For example, the main seal pattern can be formed using an ultraviolet light curing-type sealing material, specifically sealing material TB3035B (viscosity: 51 Pa·s) manufactured by ThreeBond Holdings Co., Ltd. (acrylic resin material).

An empty cell is fabricated by overlapping the upper and lower substrates 10 and 20. The electrolytic solution 51 containing the ED material is injected into the hollow cell using a vacuum injection method, for example, and, then, the injection port is sealed and the sealing material is irradiated with ultraviolet light to cure the sealing material. As a result, the seal frame member 70, and the electrolyte layer (electrolytic solution) 51 sealed inside the seal frame member 70 are formed.

The electrolytic solution 51 containing the ED material includes the ED material (AgBr, or the like), a mediator ($CuCl_2$, or the like), a supporting electrolyte (LiBr, or the like), a solvent (γ-butyrolactone, or the like), and the like. In one example, the electrolytic solution 51 containing the ED material is obtained by adding, to a solvent, namely, γ-butyrolactone, 200 mM of AgBr as the ED material, 800 mM of LiBr as the supporting electrolyte, and 30 mM of $CuCl_2$ as the mediator.

Silver-containing AgBr, $AgNO_3$, $AgClO_4$, or the like can be used for the ED material. Other than $CuCl_2$, Ta-containing $TaCl_5$, $TaBr_5$, and $TaI_5$, Ge-containing $GeCl_4$, $GeBr_4$, and $GeI_4$, Cu-containing $CuSO_4$ and $CuBr_2$, and the like can be used as the mediator The supporting electrolyte is not limited provided that the supporting electrolyte promotes the redox reaction and the like of the electrodeposition material. For example, a lithium salt (LiCl, LiBr, LiI, $LiBF_4$, $LiClO_4$, and the like), a potassium salt (KCl, KBr, KI, and the like), or a sodium salt (NaCl, NaBr, NaI, and the like) can be favorably used as the supporting electrolyte. It is preferable that the supporting electrolyte has a concentration of from 10 mM to 1 M, for example, but the concentration is not particularly limited.

The solvent is not limited provided that the solvent can stably hold the electrodeposition material and the like. Polar solvents such as water and propylene carbonate, non-polar organic solvents, ionic liquids, ionic conductive polymers, polymer electrolytes, and the like can be used as the solvent. Specifically, in addition to γ-butyrolactone, dimethyl sulfoxide (DMSO), propylene carbonate, N,N-dimethylformamide, tetrahydrofuran, acetonitrile, polyvinyl sulfuric acid, polystyrene sulfonic acid, polyacrylic acid, and the like can be favorably used.

The ED element 110 can be fabricated as described above.

As illustrated in the upper portion of FIG. 1C, when negative potential (for example, −2.5 V) is applied to the upper power supply connection electrode 22p (upper electrode 22) with the potential of the lower power supply connection electrode 12p (lower electrode 12) as a reference, the ED material in the electrolyte layer 51 precipitates/deposits on the surface of the upper electrode 22 due to the redox reactions on the electrode 12 and 22 surfaces (due to current flowing in the thickness direction in the electrolyte layer 51), and a light reflecting film (silver thin film) 51d is formed. At this time, the ED element 110 (in particular, the switching region As) realizes a light reflecting state.

Note that, when the application of the voltage is stopped, the ED material (the light reflecting film 51d) that has precipitated/deposited on the electrode surfaces dissolves into the electrolyte layer (electrolytic solution) 51 again, and disappears from the electrode surfaces. That is, the ED element 110 returns to the light transmitting state.

Thus, the electrolyte layer 51 can switch between a transmitting state and an ED material precipitated state. Accordingly, the ED element 110 (in particular, the switching region As) can switch between the light transmitting state (when voltage is not applied) and the light reflecting state (when voltage is applied).

In the reference example, the thickness of the light reflecting film 51d deposited on the surface of the upper electrode 22 may be non-uniform. Specifically, the thickness of the light reflecting film 51d may become relatively thicker at both ends in the width direction of the switching region As near the power supply connection electrodes 12p and 22p, and the thickness of the light reflecting film 51d may become relatively thinner (or may not form) at the center in the width direction of the switching region As. As such, in the light reflecting state, light reflectance may become relatively higher at both ends of the switching region As near the power supply connection electrodes 12p and 22p, and light reflectance may become relatively lower at the center of the switching region As.

As illustrated in the lower portion of FIG. 1C, the non-uniformity of thickness (light reflectance) is caused by the distribution (variance) of a current density Id in the width direction X of the current flowing between the upper and lower electrodes 12 and 22 (in the thickness direction of the electrolyte layer 51). The distribution (variance) of the current density Id becomes prominent when the electrodes 12 and 22 are formed from a member that has high electrical resistivity (low electrical conductivity) such as ITO and the like, and the width of the switching region As (or the electrolyte layer 51) is wide (for example, 64 mm or greater).

When the electrical resistivity of the electrodes 12 and 22 is high (electrical conductivity is low) and the width of the switching region As is wide, the current density Id of the current flowing between the electrodes 12 and 22 (in the thickness direction of the electrolyte layer 51) becomes relatively higher in regions near the current supply sources, and relatively lower in regions separated from the current supply sources. The amount of precipitation of the ED material (thickness of deposited film) has positive correlation with the current density of the current flowing in the thickness direction of the electrolyte layer. As such, the thickness of the light reflecting film 51d is thicker at both ends of the switching region As near the current supply sources, that is, the power supply connection electrodes 12p and 22p, and the thickness of the light reflecting film 51d is thinner at the center of the switching region As.

When the thickness of the light reflecting film 51d changes by position, the optical characteristics (light reflectance) in the element plane also change by position. Generally, it is preferable that the optical characteristics of an optical element are uniform in the element plane.

Figure 2A:
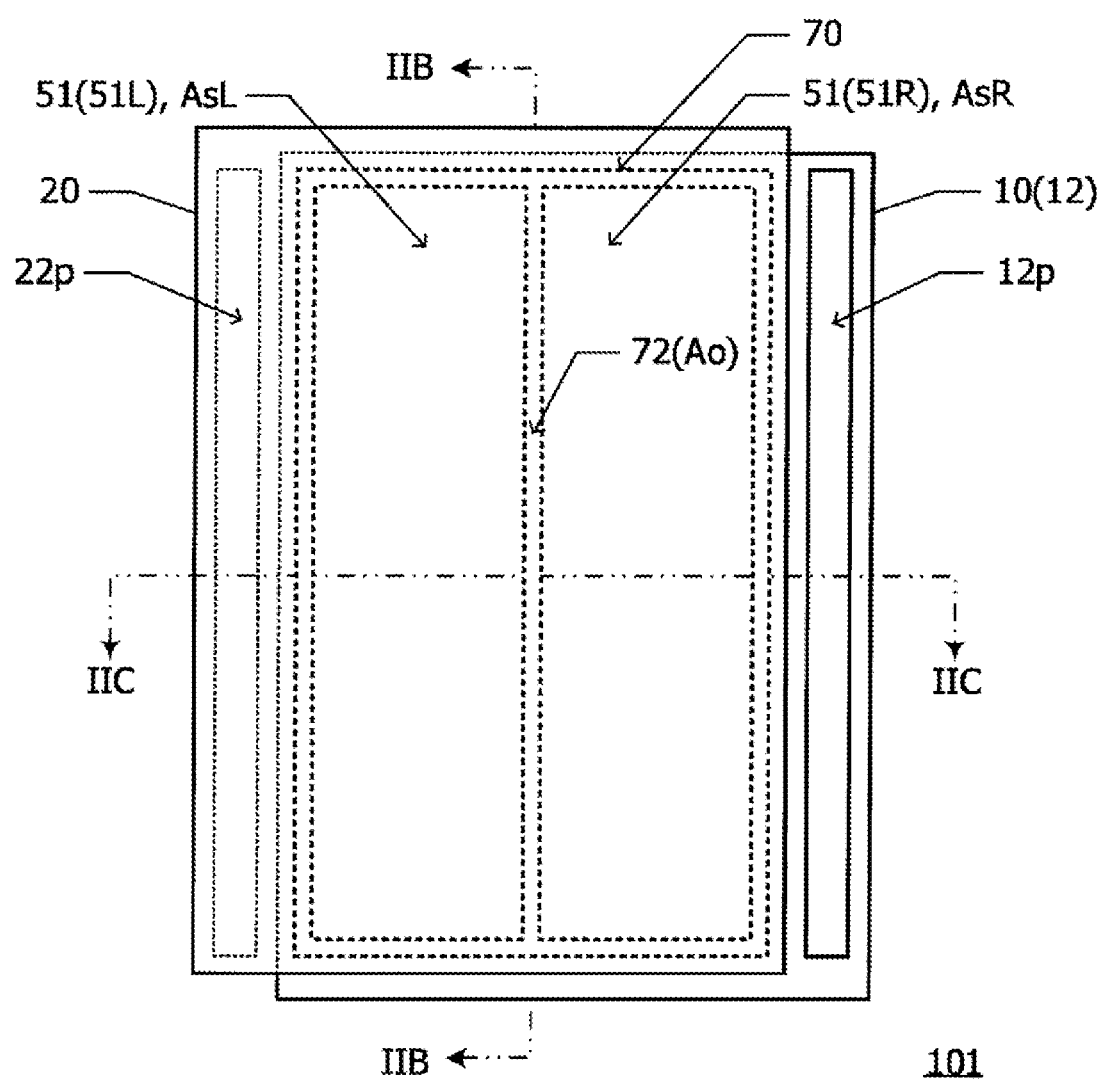
FIGS. 2A to 2C are a plan view and cross-sectional views illustrating an electrodeposition element according to Embodiment 1.
Figure 2B:
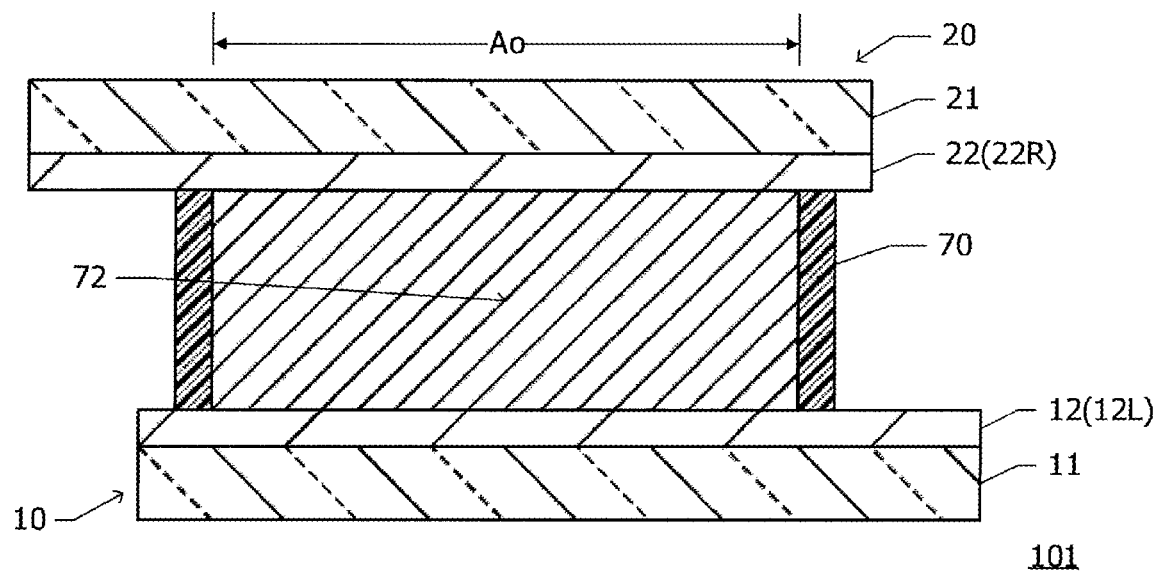
Figure 2C:
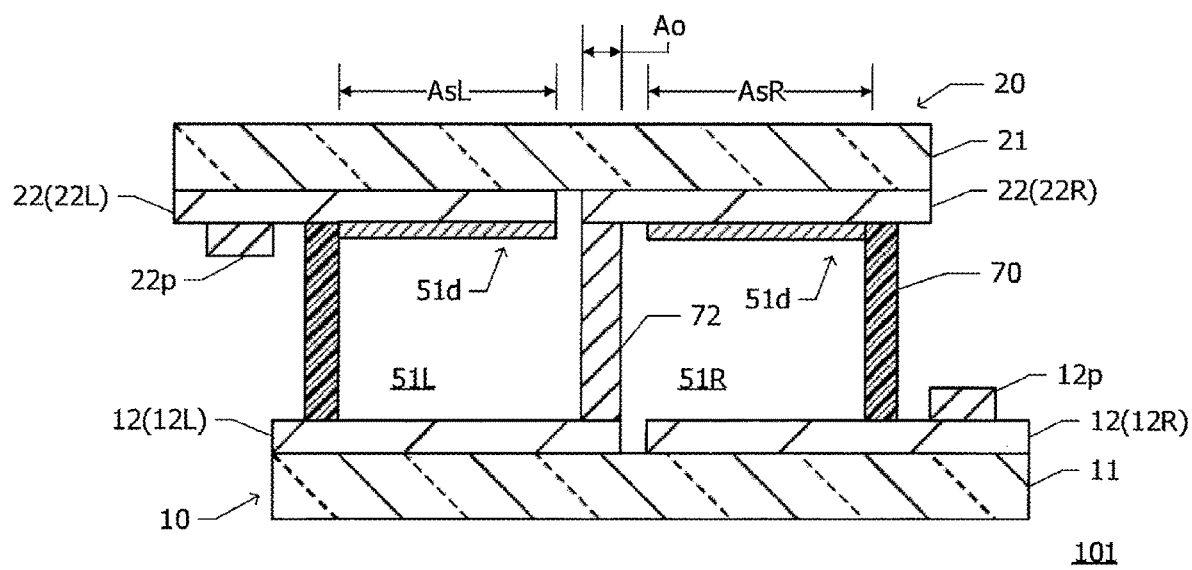

FIGS. 2A to 2C are a plan view and cross-sectional views illustrating an ED element 101 according to Embodiment 1. The IIB-IIB cross-section and the IIC-IIC cross-section in the plan view illustrated in FIG. 2A respectively correspond to the cross-sectional views illustrated in FIGS. 2B and 2C.

As illustrated in FIG. 2A, as with the ED element 110 according to the reference example, the ED element 101 according to Embodiment 1 includes lower and upper substrates 10 and 20 that are disposed facing each other, a seal frame member 70 provided on the periphery of a region in which the lower substrate and the upper substrate 10 and 20 overlap each other, and an electrolytic solution (electrolyte layer) 51 that a space, defined by the lower and upper substrates 10 and 20 and the seal frame member 70, is filled with. Additionally, power supply connection electrodes 12p and 22p are respectively provided of the lower and upper substrates 10 and 20.

The ED element 101 according to Embodiment 1 mainly differs from the ED element 110 according to the reference example with regards to the presence/absence of a conductive member 72, and the shape of the upper and lower electrodes 12 and 22.

The ED element 101 according to Embodiment 1 includes a conductive member 72 that vertically transverses the electrolytic solution 51. Due to the conductive member 72, the electrolytic solution 51 is divided into a left electrolytic solution (first electrolytic solution) 51L and a right electrolytic solution (second electrolytic solution) 51R.

Additionally, the electrodes 12 and 22 constituting the upper and lower substrates 10 and 20 are also divided into two left and right columns (see FIG. 2C). The electrolytic solution 51L and the upper and lower electrodes 12L and 22L disposed on the left side constitute a switching region AsL, and the electrolytic solution 51R and the upper and lower electrodes 12R and 22R disposed on the right side constitute a switching region AsR.

As illustrated in FIG. 2B, the conductive member 72 is provided continuously (in a partition wall shape) from one end to the other end of the seal frame member 70. The electrolytic solution 51 is divided into the first and second electrolytic solutions 51L and 51R by the conductive member 72 (see FIG. 2A).

As illustrated in FIG. 2C, the lower electrode 12 provided on the lower substrate 10 is divided into a lower-left electrode (first lower electrode) 12L and a lower-right electrode (second lower electrode) 12R. Likewise, the upper electrode 22 provided on the upper substrate 20 is divided into an upper-left electrode (first upper electrode) 22L and an upper-right electrode (second upper electrode) 22R. In one example, the spacing between the lower-left electrode 12L and the lower-right electrode 12R and the spacing between the upper-left electrode 22L and the upper-right electrode 22R is 500 µm.

More specifically, an arrangement is provided in which the lower-left electrode 12L and the upper-left electrode 22L face each other, and the lower-right electrode 12R and the upper-right electrode 22R face each other. A region in which the lower-left electrode 12L and the upper-left electrode 22L face each other across the left electrolytic solution 51L constitutes a left switching region AsL, and a region in which the lower-right electrode 12R and the upper-right electrode 22R face each other across the right electrolytic solution 51R constitutes a right switching region AsR In one example, the widths of the switching regions AsL and AsR (electrolytic solutions 51L and 51R) are 63 mm or less.

Note that a region is provided in which a portion of the lower-left electrode 12L and a portion of the upper-right electrode 22R face each other. The region in which the lower-left electrode 12L and the upper-right electrode 22R face each other is called an overlap region Ao. In one example, a width of the overlap region Ao is 1000 µm.

In a planar view, the conductive member 72 is formed in the overlap region Ao or overlapping the overlap region Ao (see FIG. 2A). The conductive member 72 electrically connects the lower-left electrode 12L to the upper-right electrode 22R.

In one example, the conductive member 72 is formed from a resin member in which conductive particles are mixed. The conductive particles are formed, for example, from glass beads that are coated with an Ag thin film and that have a diameter of about 70 µm. In one example, the conductive member 72 is formed by mixing 10 wt % of Ag film coated glass beads, manufactured by Unitika, Ltd. (powder electrical resistance: 0.004 Ω·cm) with sealing material TB3035B, manufactured by ThreeBond Holdings Co., Ltd.

Negative potential is applied to the power supply connection electrode 22p of the upper substrate 20, with the potential of the power supply connection electrode 12p of the lower substrate 10 as a reference. At this time, the current flows from the lower-right electrode 12R to the upper-right electrode 22R via the right electrolytic solution 51R, through the conductive member 72, and from the lower-left electrode 22L to the upper-left electrode 22L via the left electrolytic solution 51L. The light reflecting film 51d is formed on the surface of each of the upper electrodes 22L and 22R by the redox reaction that occurs on the electrode surfaces.

The ED element 101 according to Embodiment 1 is equivalent to an element in which a left ED element including the lower-left electrode 12L, the upper-left electrode 22L, and the left electrolytic solution 51L, and a right ED element including the lower-right electrode 12R, the upper-right electrode 22R, and the right electrolytic solution 51R are electrically connected in series by the conductive member 72.

In Embodiment 1, the width of each of the switching regions AsL and AsR (electrolytic solutions 51L and 51R) is narrow (for example, 63 mm or less). As such, the current density distribution (variance) in the width direction of the current flowing through each of the electrolytic solutions 51L and 51R is small, and the thickness of the light reflecting film 51d formed on the surface of each of the upper electrodes 22L and 22R is comparatively uniform. Accordingly, when viewing the entire ED element 101 (when considering the switching regions AsL and AsR as a single body), changes in the optical characteristics (light reflectance) due to position are suppressed (the light reflectance in the element plane is uniform).

Note that the spacing between the switching regions AsL and AsR (that is, the spacing between the lower-left electrode 12L and the lower-right electrode 12R, the spacing between the upper-left electrode 22L and the upper-right electrode 22R, and the region in which the conductive member 72 is disposed, namely the overlap region Ao) are non-control regions in which the optical state cannot be switched. In order to make the optical characteristics uniform in the entire ED element 101, it is desirable that the width of the non-control regions be made as small as possible. However, to prevent direct current from flowing between the lower-left electrode 12L and the lower-right electrode 12R and between the upper-left electrode 22L and the upper-right electrode 22R, it is preferable that those spacings are, for example, at least five-times larger than the spacing between the lower electrode 12 and the upper electrode 22 (the thickness of the electrolyte layer 51).

The conductive member 72 need not be formed continuously from one end to the other end of the seal frame member 70. The non-control regions can be made smaller by selectively providing the conductive member 72.

Figure 3A:
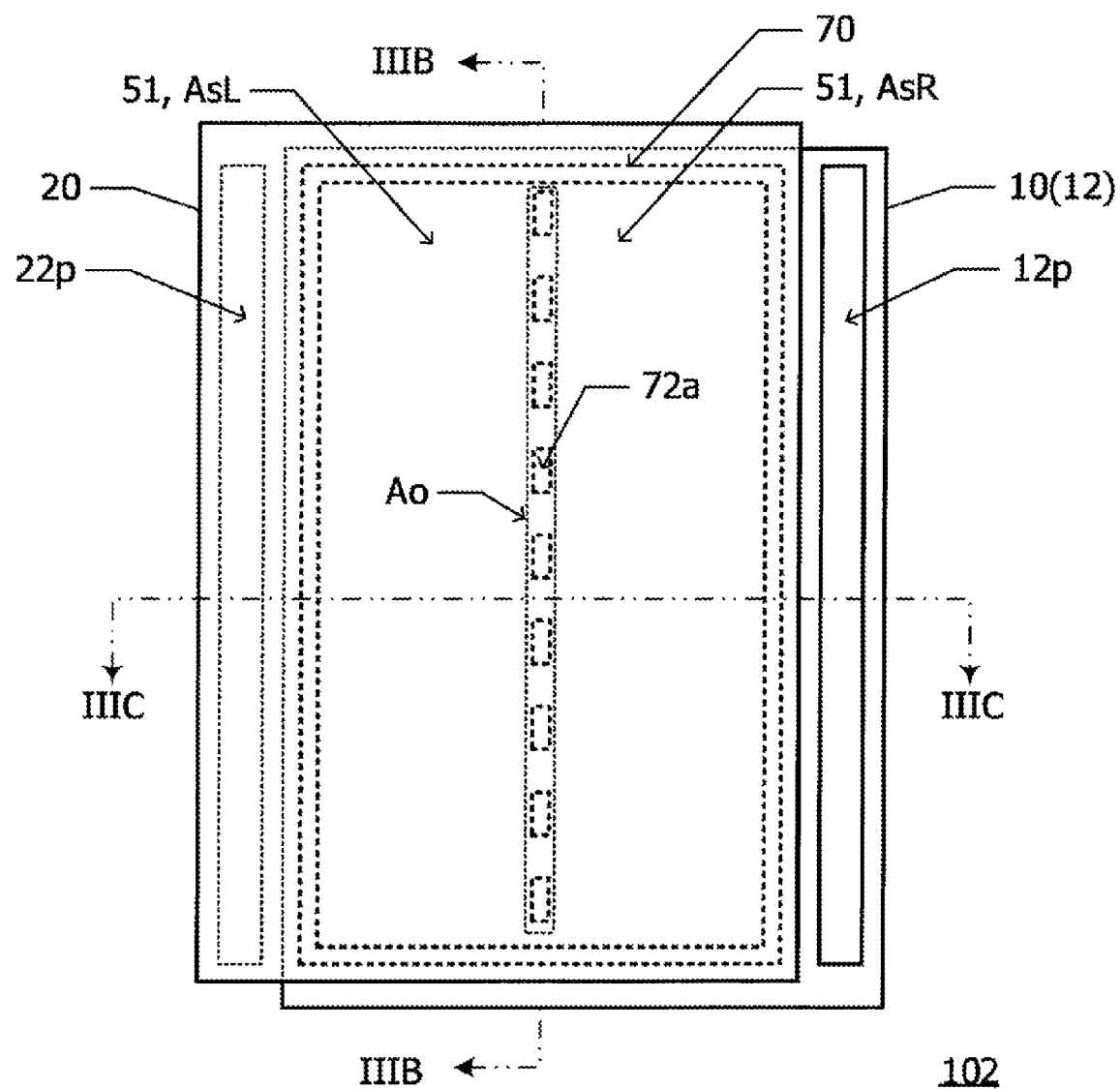
FIGS. 3A to 3C are a plan view and cross-sectional views illustrating an electrodeposition element according to Embodiment 2.
Figure 3B:
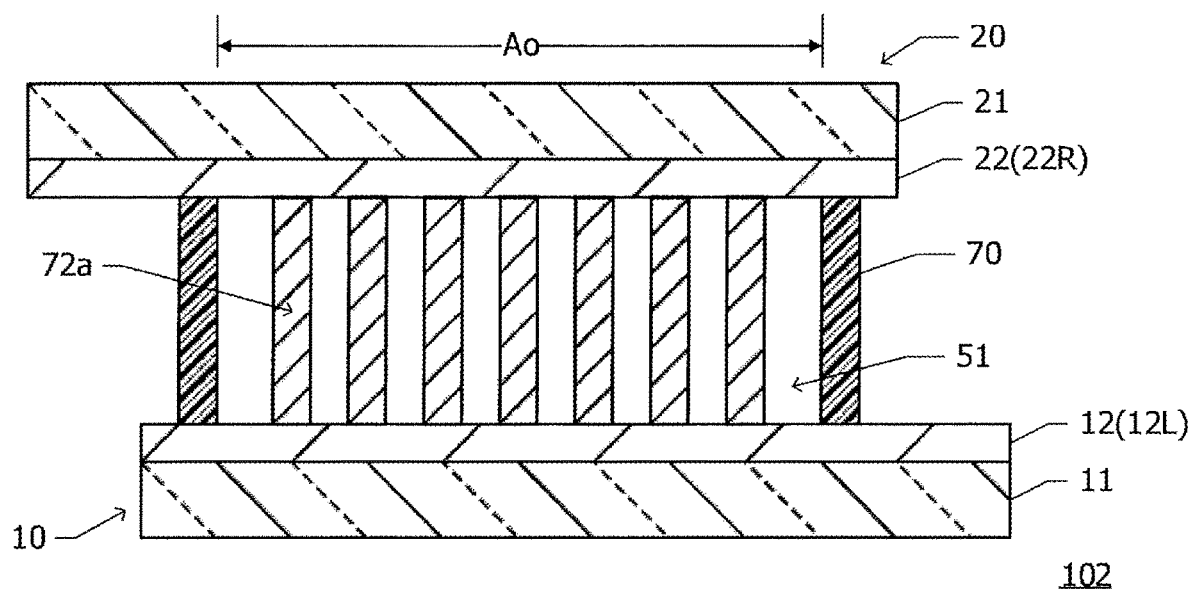
Figure 3C:
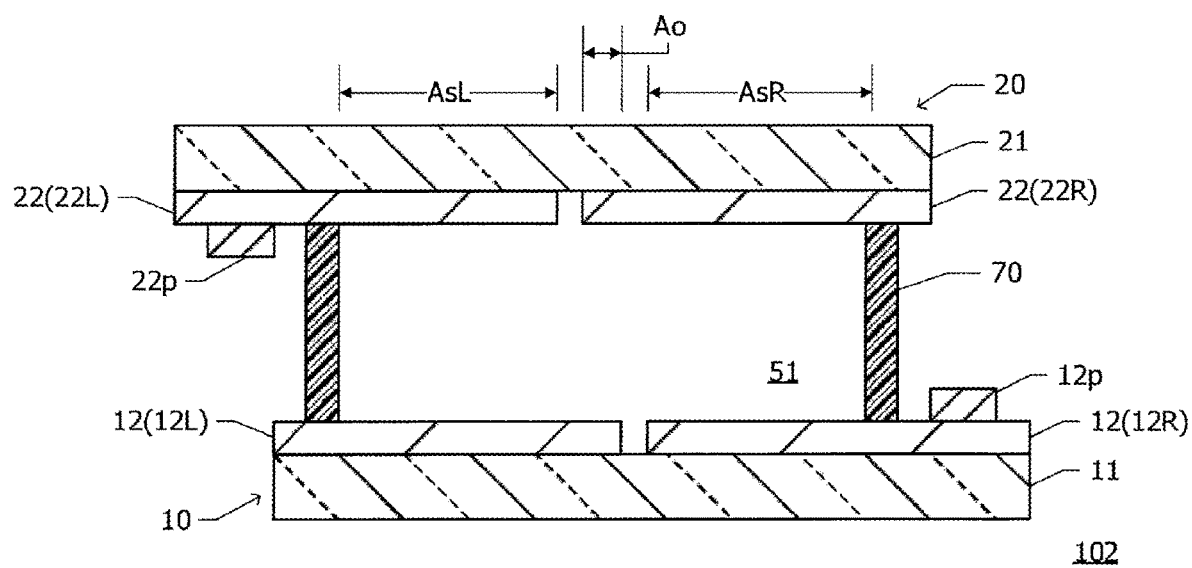

FIGS. 3A to 3C are a plan view and cross-sectional views illustrating an ED element 102 according to Embodiment 2. The IIIB-IIIB cross-section and the IIIC-IIIC cross section in the plan view illustrated in FIG. 3A respectively correspond to the cross-sectional views illustrated in FIGS. 3B and 3C.

As illustrated in FIG. 3A, in the ED element 102, a conductive member 72a is formed intermittently (in a dashed line manner) in the overlap region Ao. As such, the electrolytic solution 51 is continuous in the regions in which the conductive member 72a is not provided. The switching region is divided into the left switching region AsL and the right switching region AsR by the conductive member 72a. The other configurations of the ED element 102 according to Embodiment 2 are the same as the configurations of the ED element 101 according to Embodiment 1.

As illustrated in FIG. 3B, the conductive member 72a is provided intermittently from one end to the other end of the seal frame member 70. The electrolytic solution 51 is not divided by the conductive member 72a, and is continuous in the regions where the conductive member 72a is not provided (FIG. 3A).

As illustrated in FIG. 3C, there are regions in the overlap region Ao, in which the lower-left electrode 12L and the upper-right electrode 22R face each other, where the conductive member 72a is not provided. Note that, the regions where the conductive member 72a is provided have the same cross-sectional structure in the width direction of the ED element 102 as the cross-section illustrated in FIG. 2C.

Due to the conductive member 72a that electrically connects the lower-left electrode 12L to the upper-right electrode 22R being selectively (intermittently) provided in the overlap region Ao, it is possible to make the non-control regions, in which the optical characteristics of the switching regions AsL and AsR can differ, smaller (more inconspicuous and difficult to recognize). Due to this, the appearance quality of the ED element is improved.

Note that the conductive member 72a may be formed so as to project to the outside of the overlap region Ao.

Additionally, since the overlap region Ao is a non-control region, it is desirable that the regions other than the regions in which the conductive member 72a is disposed are as small as possible or do not exist. That is, it is desirable that the lower-left electrode 12L and the upper-left electrode 22L are disposed (overlap in a plan view), or the lower-right electrode 12R and the upper-right electrode 22R are disposed (overlap in a plan view) in the regions other than the regions in which the conductive member 72a is disposed, For example, in a plan view, it is desirable that a boundary between the divided upper and lower electrodes has an uneven shape that corresponds to the regions in which the conductive member is disposed.

Note that, when the disposal spacing of the conductive member is excessively wide (when the conductive member is sparsely disposed), deviations of the current density become remarkable, and inconsistencies in the optical characteristics (light reflectance) in the vertical direction (the length direction) may occur. In this case, it is preferable that an auxiliary electrode that has a lower resistivity than the upper and lower electrodes is provided between the conductive member and upper and lower electrodes.

FIGS. 4A to 4D are a plan view and cross-sectional views illustrating a Modified Example 102a of an ED element according to Embodiment 2. The IVB-IVB cross-section, the IVC-IVC cross-section, and the IVD-IVD cross-section in the plan view illustrated in FIG. 4A respectively correspond to the cross-sectional views illustrated in FIGS. 4B, 4C, and 4D.

Figure 4A:
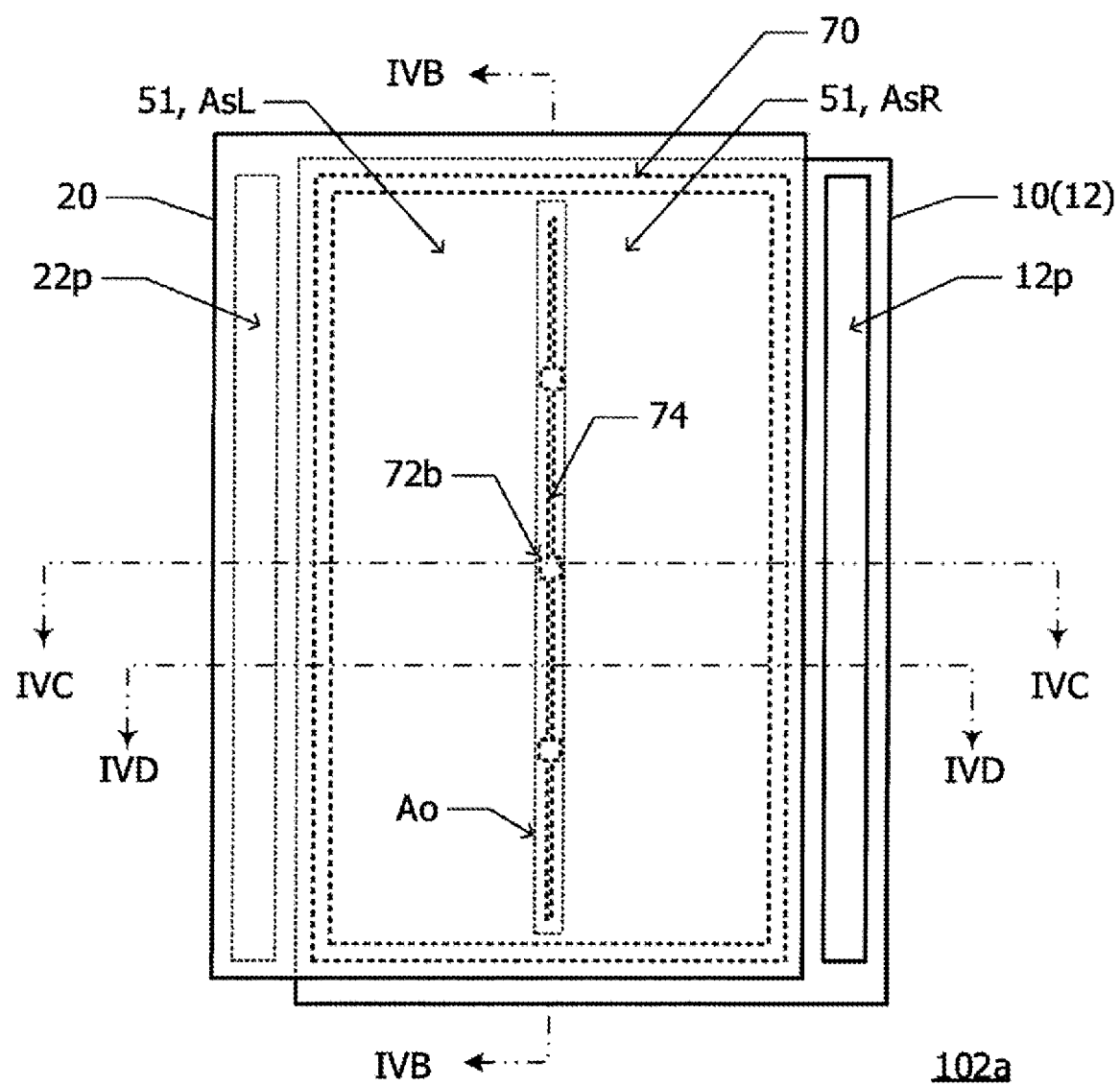
FIGS. 4A to 4D are a plan view and cross-sectional views illustrating a Modified Example of the electrodeposition element according to Embodiment 2.

As illustrated in FIG. 4A, in the ED element 102a, a low-resistance member 74 elongated in the vertical direction (the length direction) is provided in the overlap region Ao. Additionally, the conductive member 72b is formed sparsely, overlapping the low-resistance member 74. Since it is preferable that the non-control regions of the ED element 102a are small, it is preferable that the width of the low-resistance member 74 is as narrow as possible.

Figure 4B:
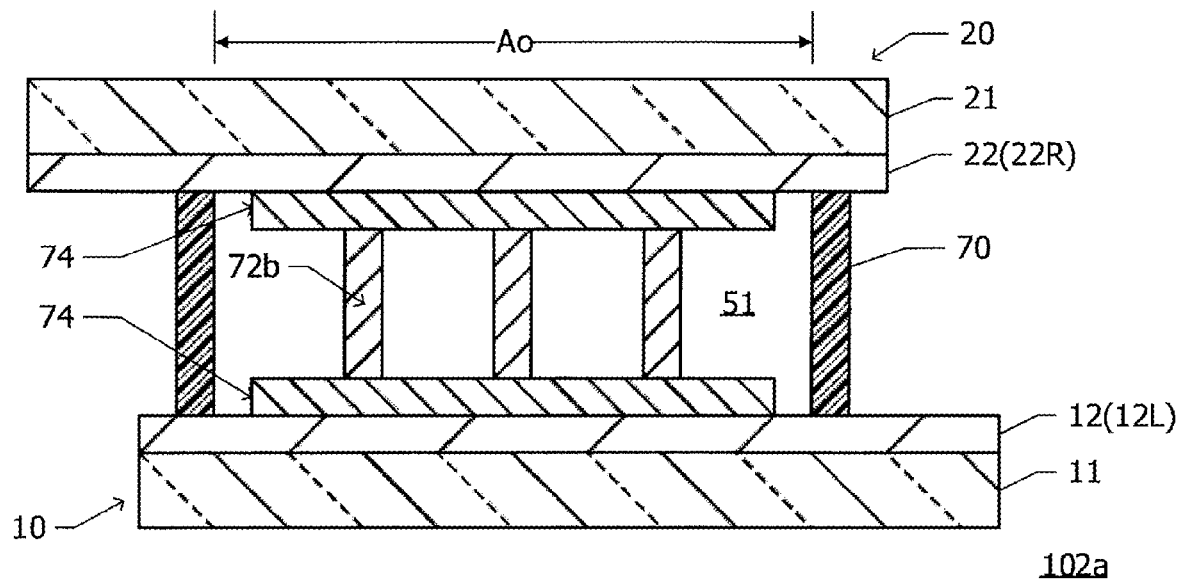
Figure 4C:
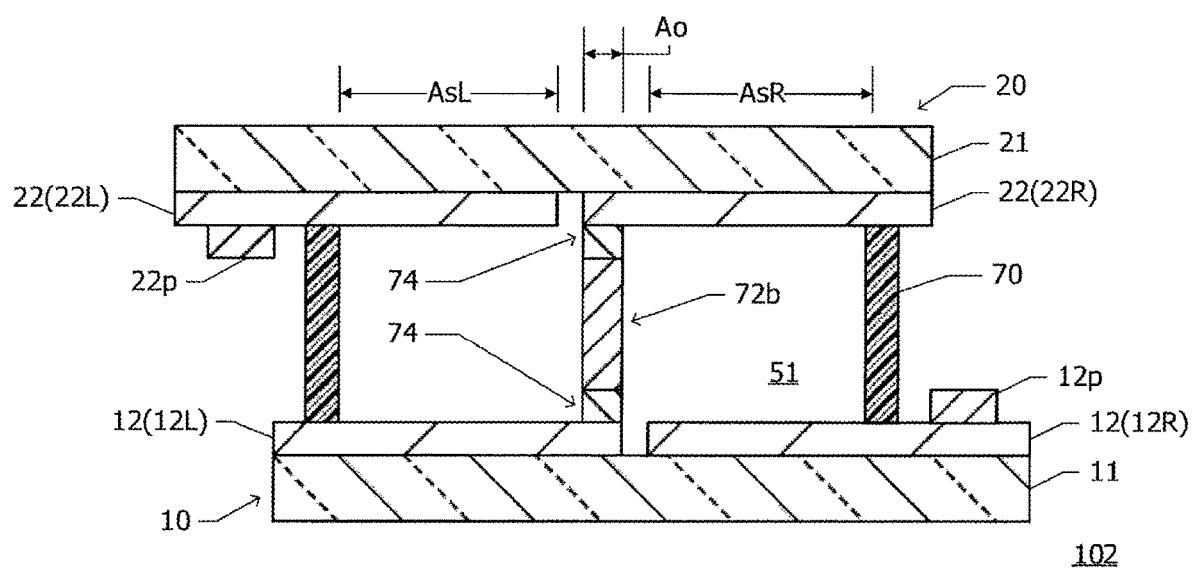

As illustrated in FIGS. 4B and 4C, the conductive member 72b is connected to the lower-left electrode 12L and the upper-right electrode 22R via the low-resistance member 74. In one example, the low-resistance member 74 is formed from platinum. The low-resistance member 74 can be formed/patterned by a masked sputtering method.

Figure 4D:
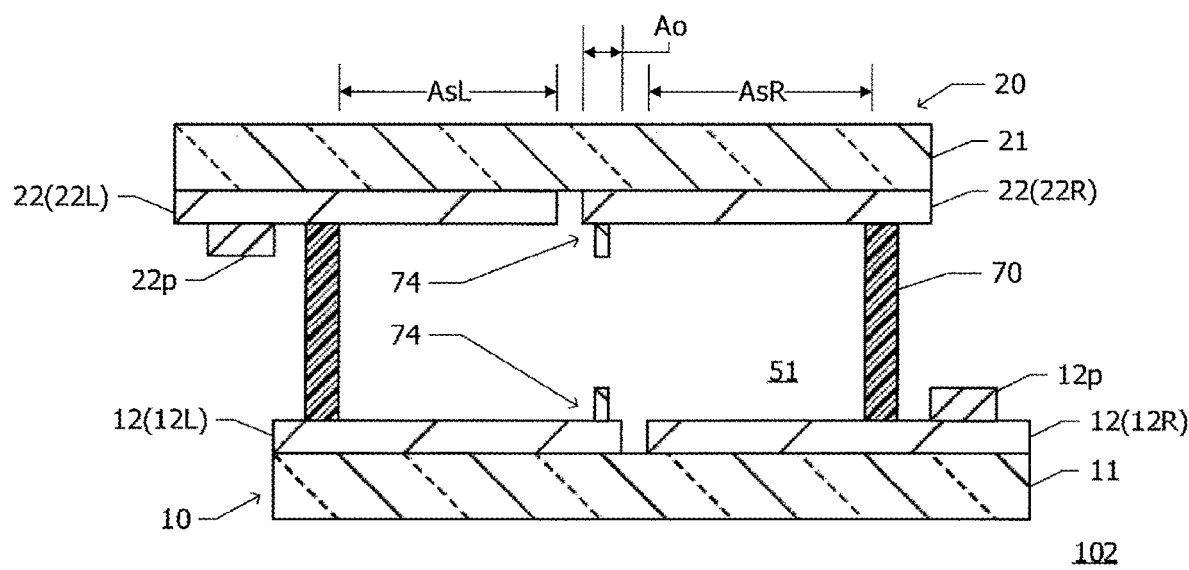

As illustrated in FIG. 4D, the low-resistance member 74 is formed relatively narrow in the regions in which the conductive member 72b is not formed. Even in a case in which the conductive member 72b is formed sparsely, due to the low-resistance member 74 being provided, the current density in the vertical direction (the length direction) can be made uniform, and inconsistencies in the optical characteristics of the ED element can be improved.

Figure 5A:
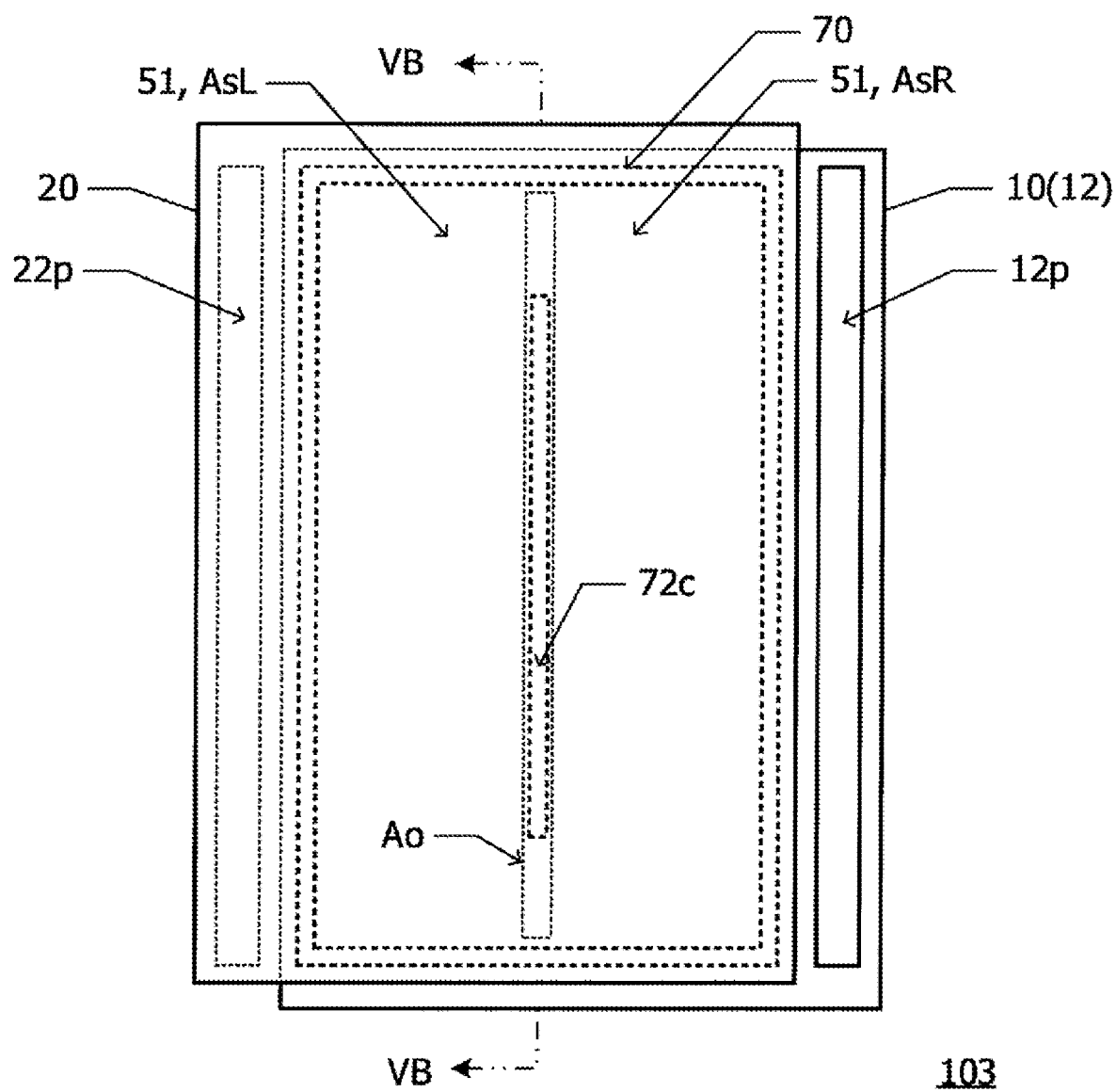
FIGS. 5A and 5B are a plan view and a cross-sectional view illustrating an electrodeposition element according to Embodiment 3.
Figure 5B:
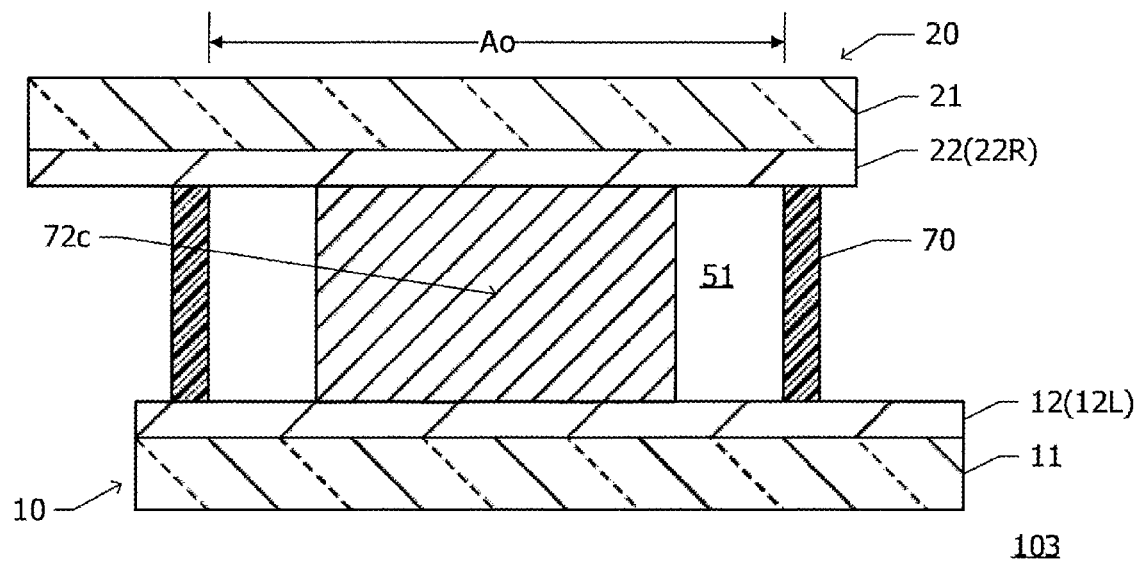

FIGS. 5A and 5B are a plan view and a cross-sectional view illustrating an ED element 103 according to Embodiment 3. The VB-VB cross-section in the plan view illustrated in FIG. 5A corresponds to the cross-sectional view illustrated in FIG. 5B.

As illustrated in FIG. 5A, in the ED element 105, a conductive member 72c is formed continuously in a partial region in the overlap region Ao. As such, the electrolytic solution 51 is continuous in the regions in which the conductive member 72c is not provided. The other configurations of the ED element 103 according to Embodiment 3 are the same as the configurations of the ED element 101 according to Embodiment 1.

As illustrated in FIG. 5B, the conductive member 72c is formed continuously in a center region in the overlap region Ao. The electrolytic solution 51 is not divided by the conductive member 72c, and is continuous in the regions where the conductive member 72c is not provided (FIG. 5A).

Note that the region where the conductive member 72c is provided has the same cross-sectional structure in the width direction of the ED element 103 as the cross-section illustrated in FIG. 2C. Additionally, the region where the conductive member 72c is not provided has the same cross-sectional structure as the cross-section illustrated in FIG. 3C.

Due to the conductive member 72c that electrically connects the lower-left electrode 12L to the upper-right electrode 22R being selectively provided (continuously provided in a partial region) in the overlap region Ao, it is possible to make the non-control regions, in which optical characteristics of the switching regions AsL and AsR can differ, smaller. Due to this, the appearance quality of the ED element is improved.

Figure 6A:
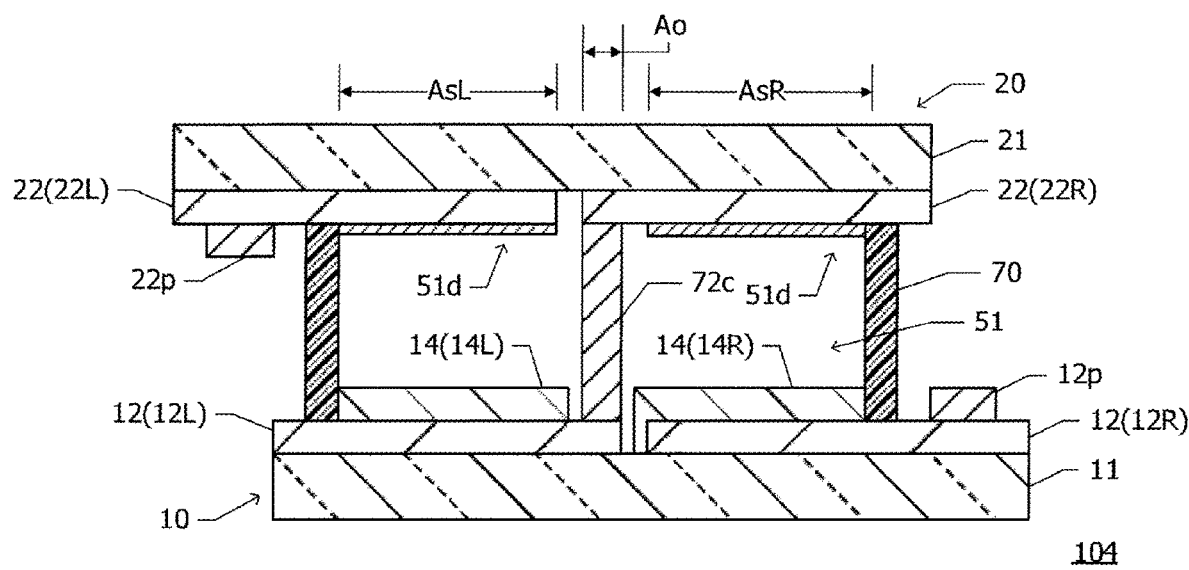
FIG. 6A is a cross-sectional view illustrating an electrodeposition element according to Embodiment 4.

FIG. 6A is a cross-sectional view illustrating an ED element 104 according to Embodiment 4. In the ED element 104 according to Embodiment 4, electrochemical reaction layers 14L and 14R are respectively provided on the surfaces of the lower electrodes 12L and 12R. Note that, the electrochemical reaction layer 14L is formed on the surface of the lower-left electrode 12L so as to avoid the region in which the conductive member 72a is provided.

When providing the electrochemical reaction layers 14L and 14R on the lower electrode 12, the electrolytic solution need not contain the mediator and, in Embodiment 4, an electrolytic solution 52 obtained by adding 200 mM of AgBr as the ED material and 800 mM of LiBr as the supporting electrolyte to a solvent, namely γ-butyrolactone, is used.

The other configurations of the ED element 104 according to Embodiment 4 are the same as the configurations of the ED element 103 according to Embodiment 3. Note that the other configurations of the ED element 104 according to Embodiment 4, particularly the flat shape of the conductive member, may be the same as the configurations of the ED element according to Embodiment 1 or Embodiment 2 (see FIGS. 2A, 3A, and 5A).

Iron(III) hexacyanoferrate(II) or $(Fe_4[Fe(CN)_6]_3)$, commonly known as Prussian blue, or nickel oxide, for example, can be used for the electrochemical reaction layers 14L and 14R. Prussian blue is colorless and transparent in a reduced state, and is blue in an oxidized state. Nickel oxide is colorless and transparent in a reduced state, and is brown in an oxidized state.

The Prussian blue can be fabricated, for example, by coating a dispersion on the electrode surfaces by a spin-coating method using a mask and, then, baking. The nickel oxide can be fabricated on the electrodes by sputtering using a mask.

When using the Prussian blue for the electrochemical reaction layers 14L and 14R, when applying voltage in the forward direction (when applying negative potential to the upper power supply connection electrode 22p with the potential of the lower power supply connection electrode 12p as a reference), the light reflecting film 51d is formed on the surfaces of the upper electrodes 22L and 22R, and the electrochemical reaction layers 14L and 14R change color to blue. When using the nickel oxide for the electrochemical reaction layers 14L and 14R, when voltage is applied in the forward direction, the light reflecting film 51d is formed on the surfaces of the upper electrodes 22L and 22R, and the electrochemical reaction layers 14L and 14R change color to brown.

At this time, when observing the ED element 104 from the upper substrate 20 side, the ED element 104 is recognized as a typical mirror. Additionally, when observing the ED element 104 from the lower substrate 10 side, the ED element 104 is recognized as a colored (blue or brown) mirror.

When providing the electrochemical reaction layers 14L and 14R, after applying voltage in the forward direction, even if the application of voltage is stopped, the light reflecting film 51d remains on the upper electrodes 22L and 22R (the electrochemical reaction layers 14L and 14R also hold the blue or brown color) for a long period of time (for example, one hour or longer). Note that, when applying voltage in the reverse direction (when applying positive potential to the upper power supply connection electrode 22p with the potential of the lower power supply connection electrode 12p as a reference), the light reflecting film 51d on the surfaces of the upper electrodes 22L and 22R instantaneously disappears, and the electrochemical reaction layers 14L and 14R return to being transparent.

Figure 6B:
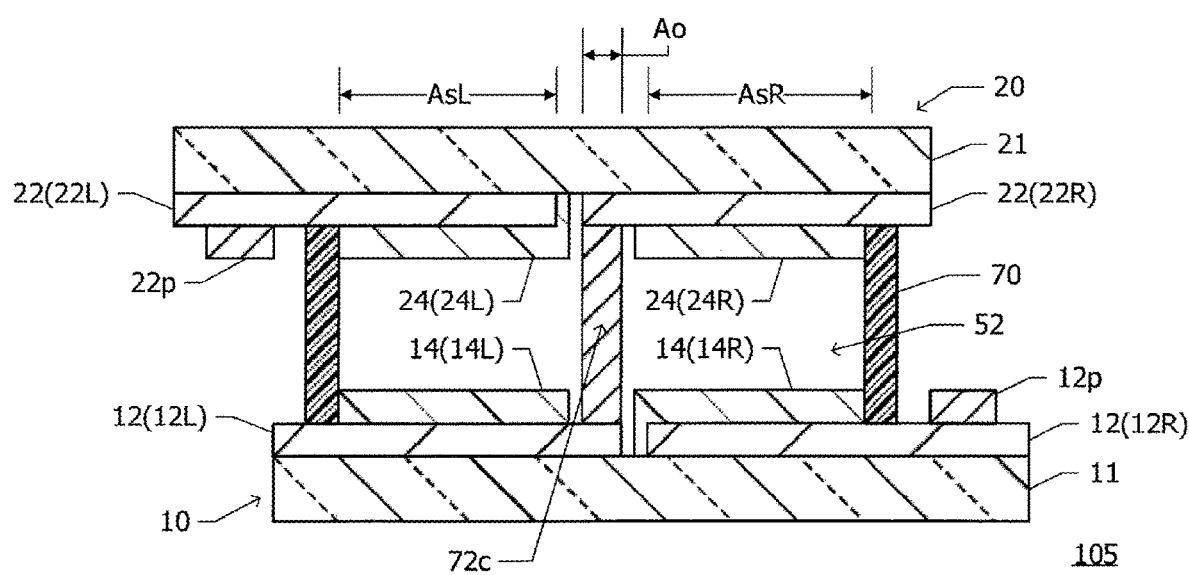
FIG. 6B is a cross-sectional view illustrating an electrodeposition element according to Embodiment 5.

FIG. 6B is a cross-sectional view illustrating an optical element 105 according to Embodiment 5. In the optical element 105 according to Embodiment 5, electrochemical reaction layers 14L, 14R, 24L, and 24R are respectively provided on the surfaces of the lower electrodes 12L and 12R and on the surfaces of the upper electrodes 22L and 22R. Prussian blue, for example, is used for the lower electrochemical reaction layers 14L and 14R, and nickel oxide, for example, is used for the upper electrochemical reaction layers 24L and 24R.

When providing the electrochemical reaction layers 14 and 24 on the upper and lower electrodes 12 and 22, the electrolytic solution need not contain the ED material and the mediator. In Embodiment 5, an electrolytic solution 53 obtained by adding 800 mM of LiCl as the supporting electrolyte to a solvent, namely γ-butyrolactone, is used.

The other configurations of the optical element 105 according to Embodiment 5 are the same as the configurations of the ED element 103 according to Embodiment 3. The other configurations of the optical element 105 according to Embodiment 5, particularly the shape of the conductive member, may be the same as the configurations of the ED element according to Embodiment 1 or Embodiment 2 (see FIGS. 2A, 3A, and 5A).

When providing the electrochemical reaction layers 14 and 24 on the upper and lower electrodes 12 and 22, when applying voltage in the forward direction (when applying negative potential to the upper power supply connection electrode 22p with the potential of the lower power supply connection electrode 12p as a reference), the lower electrochemical reaction layers 14L and 14R (the Prussian blue) change color to blue. Additionally, when applying voltage in the reverse direction (when applying positive potential to the upper power supply connection electrode 22p with the potential of the lower power supply connection electrode 12p as a reference), the upper electrochemical reaction layers 24L and 24R (the nickel oxide) change color to brown.

It is thought that the optical element according to Embodiment 5 can, for example, be applied to a color filter or the like that is capable of color control.

Embodiments of the present disclosure are described above, but the present disclosure is not limited to these embodiments.

For example, a configuration is possible in which the lower electrode and the upper electrode are divided into three or more columns That is, a configuration is possible in which three or more columns of split electrodes that are separated from each other are arranged so as to be spread.

It is preferable that the widths of the split lower electrodes and upper electrodes are adjusted in accordance with the spacing between the upper and lower electrodes (the thickness of the electrolyte layer) and the type and concentration of the material of the electrolyte layer so that inconsistencies in the optical characteristics do not occur. Additionally, it is thought to be preferable that the lower electrodes and the upper electrodes are split at the same width so that inconsistencies in the electrical and/or optical characteristics of each switching region do not occur.

When splitting the lower electrodes and the upper electrodes into n columns, n−1 conductive members are provided. Each individual conductive member is disposed so as to electrically connect the upper split electrode and the lower split electrode that are adjacent to that conductive member.

Moreover, it would be obvious to a person skilled in the art that other various changes, modifications, combinations, and the like are possible.

The invention claimed is:

1. An optical element comprising:
   a lower substrate and an upper substrate disposed facing each other;
   a plurality of lower electrodes provided so as to be spread on a surface of the lower substrate that faces the upper substrate, and including at least first and second lower electrodes arranged adjacent in a first direction in the lower substrate plane;
   a plurality of upper electrodes provided so as to be spread on a surface of the upper substrate that faces the lower substrate, and including at least a first upper electrode that faces the first lower electrode and a second upper electrode that faces a portion of the first lower electrode and the second lower electrode;
   a conductive member that is sandwiched between the first lower electrode and the second upper electrode and that electrically connects the first lower electrode to the second upper electrode, the conductive member being selectively disposed in an overlap region in which the first lower electrode and the second upper electrode overlap when the first lower electrode and the second upper electrode are projected on a virtual plane parallel to the lower substrate or the upper substrate;
   an electrolyte layer that is disposed between the lower substrate and the upper substrate; and
   a low-resistance member that is disposed between the first lower electrode and the conductive member, and between the second upper electrode and the conductive member, and that has a lower resistivity than the first lower electrode and the second upper electrode,
   wherein the low-resistance member is provided, elongated beyond the conductive member in a second direction that crosses the first direction, in an overlap region in which the first lower electrode and the second upper electrode overlap, and is narrower in the first direction at a position beyond the conductive member than at a position where the conductive member is disposed.

2. The optical element according to claim 1, further comprising:
   a first electrochemical layer that is formed on a surface of the lower electrode, and for which an optical state changes in accordance with whether the first electrochemical layer is in an oxidized state or in a reduced state.

3. The optical element according to claim 1, further comprising:
   a second electrochemical layer that is formed on a surface of the upper electrode, and for which an optical state changes in accordance with whether the second electrochemical layer is in an oxidized state or in a reduced state.

* * * * *